Figure 1:
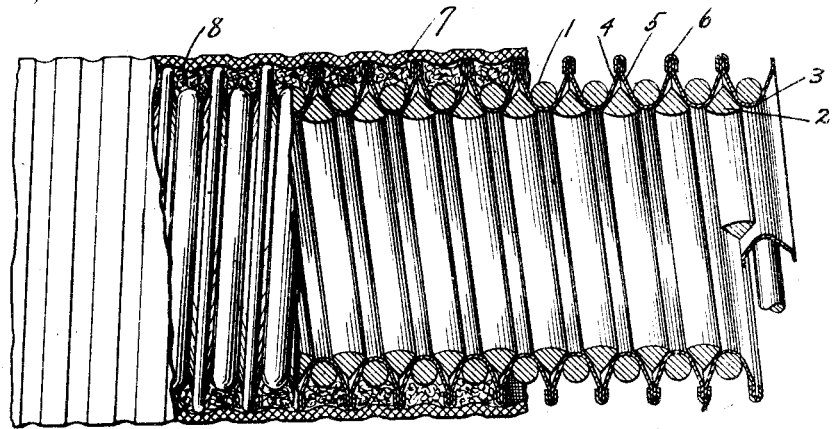

A. SUNDH.
FLEXIBLE PIPE.
APPLICATION FILED OCT. 8, 1915.

1,179,578. Patented Apr. 18, 1916.

WITNESSES:
James G. Bethell.
Walter C. Strang

August Sundh
INVENTOR

BY
ATTORNEY

UNITED STATES PATENT OFFICE.

AUGUST SUNDH, OF HASTINGS-UPON-HUDSON, NEW YORK.

FLEXIBLE PIPE.

1,179,578.   Specification of Letters Patent.   Patented Apr. 18, 1916.

Application filed October 8, 1915. Serial No. 54,701.

*To all whom it may concern:*

Be it known that I, AUGUST SUNDH, a citizen of the United States, residing in Hastings-upon-Hudson, in the county of Westchester and State of New York, have invented a new and useful Improvement in Flexible Pipe, of which the following is a specification.

My invention relates to an improvement in flexible pipes for conveying fluids, such as air, water, steam, oil, etc.

The present structure comprises two wire spirals having a corrugated tube interposed between them. The corrugated tube is formed with two loops, one extending outward of the tube, and the other extending inward, practically on a line with the inside of the tube. The structure of the tube forms an important part of my invention. Instead of being a continuous tube as in my application now on file, Serial No. 11,747, filed September 22, 1915, flexible pipe, it is made of spiral strips which may overlap on the outer edge of the outwardly extending loop and are then soldered and rolled together, or the edges may be brought together and a separate strip soldered thereover, holding the edges firmly together. I have also provided a wearing strip between the corrugations of the tube and the inner wire spiral, to prevent the inner loop of the corrugations wearing out by contact with the inner wire spiral. As shown in one of the figures of the drawing, a cover may be provided for the pipe with asbestos or some other non-heat-conducting material, which permits handling of the pipe without burning the hands when the tubing is being used for conveying steam, for instance, and the tubing will retain heat much longer than it would without a covering of this sort.

Among the advantageous features of my invention, may be mentioned the comparatively smooth inner surface of the tubing, permitting the free flow of fluid therethrough; the extending of the outwardly facing loops of the corrugated tubing beyond the outer wire spiral, where they may be readily accessible to be repaired; by having a corrugated tubing made of strips rolled or soldered together, the same is much stronger at the point where corrugated tubing generally breaks, and the corrugations will be of the same thickness and strength throughout their length, which is a great improvement as often times weak spots show up in the corrugations after the tubing is put into use, whereas with tubing constructed as mine is, such a thing will not occur. By this process of joining the edges of the strips the loops are not subjected to excessive heat, which of course would be very injurious, and they are left smooth, strong and flexible. The part of the corrugated tube which is subjected to internal pressure is held between the two wire spirals and for this reason the tube will not collapse from internal pressure. All these and other advantages will be more fully pointed out in the following detailed description and appended claims.

Figure 2:
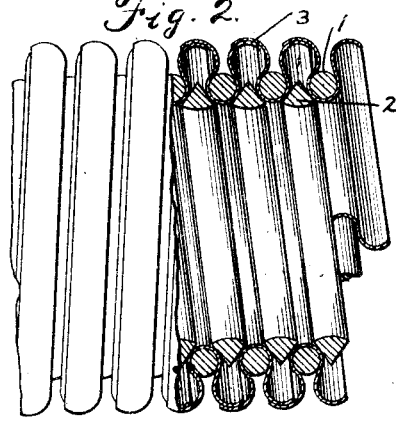
Figure 3:
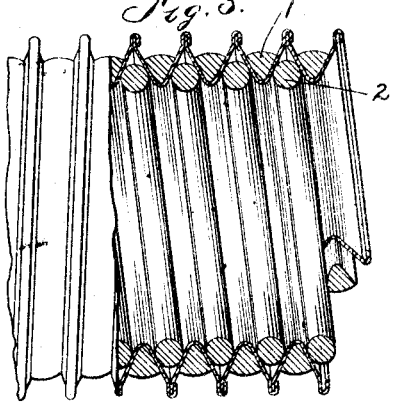
Figure 4:
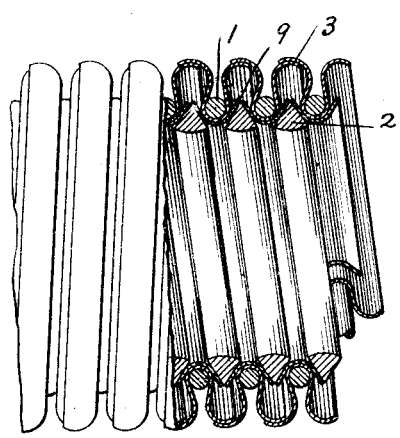

In the drawing, Figure 1 is a part sectional elevational view of one form of my invention, showing the outwardly extending loops triangular in cross section, and with a protecting cover for the whole structure; Fig. 2 is a part sectional elevational view with the outwardly extending loops circular in cross section; Fig. 3 is a modification in sectional elevation showing the outwardly extending loops triangular in cross section as in Fig. 1, but the edges overlapping; Fig. 4 is a part sectional elevation view similar to Fig. 2 but showing a wearing strip on the inside of the corrugated tubing.

Referring to the drawing in detail, in Figs. 1, 2 and 4, 1 designates a wire spiral, circular in cross section, and 2 designates a wire spiral triangular in cross section, between which is interposed a corrugated tubing 3. In Fig. 1 this corrugated tubing is formed of two strips 4 and 5, so placed that their edges are brought together to form an outwardly extending triangular shaped loop and an inwardly extending half circular loop, the edges meeting at the apex of the triangle formed by the outwardly extending loop. The two edges are held together by a strip 6, which may be of any suitable shape, here shown in the shape of an inverted U, and which is soldered to the abutting edges of the strips. The wire spiral 1 is wound around the inwardly extending loop fitting nicely in the corrugations. The inner wire spiral 2 which is triangular in cross section lies in the triangular outwardly extending loop, the inside surface of the wire spiral 2 and the bottom of the inwardly extending loop of the corrugated tubing being practically in alinement, so as to present a practically smooth surface to the passage of fluid through the tubing. Surrounding the entire structure I have a cover 7 of any suitable material, but preferably something that will wear well, and between it and the outer edges of the tubing I have shown a filling of asbestos 8, this material, however, may be any poor heat conductor. This covering will prevent a rapid escape of heat from the tubing as in the case of steam being conducted therethrough, and also enables the tubing to be handled without danger of burning the hands. The two wire spirals are so placed relative to the corrugated tubing that they will greatly strengthen the tubing when it is subjected to internal pressure, and thus prevent its collapse. With the parts arranged as I have shown them, the parts slide over each other in such a way that the tubing may be bent without danger of breaking or bringing any abnormal strain on any of the parts, and without leaking.

In Fig. 2 the construction shown is similar to Fig. 1, excepting that I have shown the outwardly extending loops circular in cross section and the edges overlapping. These overlapping edges are rolled and soldered together. The action of the parts when subject to internal pressure and when the tubing is bent is the same as in Fig. 1.

In Fig. 4 the construction is similar to Fig. 2, excepting that I have shown a wearing strip 9 between the inwardly extending loop and the corrugated tubing and the inner wire spiral. This wearing strip is preferably of softer material than the loop of the tubing. In this figure the strips forming the corrugated tube overlap as in Fig. 2.

In the modification in Fig. 3 the inwardly extending loops and outwardly extending loops of the corrugated tube are triangular in cross section. The outer edges of the outwardly extending loops overlap in the form of a U shaped hook, these edges being rolled and soldered together. In this figure the outer wire spiral is triangular in cross section and the inner wire spiral is circular in cross section. The parts are placed relative to each other, however, as in the other figures, and coöperate to form a strong flexible structure.

It will be noted that in all these constructions I have so arranged the parts that internal pressure can not act directly on the outwardly extending loop of the corrugated tubing at any time, the inner wire spiral always being in position to take this pressure. This of course greatly strengthens the structure and at the same time permits the tubing to be bent. Then again the inner wire spiral is strengthened to resist this internal pressure by having the outer wire spiral so placed that the pressure will force the inner spiral outwardly against the outer spiral, the two therefore coöperating to take up the internal pressure in the pipe. In this way the whole structure is very strong and the danger of collapse from internal pressure is reduced to a minimum.

Having the strips of which the corrugated tubing is formed meeting at their edges and rolled and soldered together as I have shown them greatly strengthens the tubing at this point, and prolongs the life of the structure.

I do not desire to be limited to the precise structure disclosed, as others skilled in the art might make various changes in the details of construction and arrangement of parts without departing from the spirit and scope of the invention.

What I claim is:—

1. In a flexible metallic pipe, the combination of spirally wound wire spirals, strips between said wire spirals and fastened together along their longitudinal edges to form a corrugated tube, said corrugated tube forming two loops, one loop facing outwardly and being free from contact with said spirals, but held in position by said spirals, and one facing inwardly of the wall of the tube, the inwardly facing loop being interposed between said wire spirals at all times.

2. In a flexible pipe, the combination of spirally wound wire spirals, a corrugated tube interposed between said spirals, said corrugated tube forming loops turning inward and loops turning outward, the inward turning loops being in frictional engagement with the wire spirals and the outward turning loops being free to yield when the pipe is bent in different directions.

3. In a flexible pipe, the combination of spirally wound wire spirals, a corrugated tube made from strips rolled and soldered together along their longitudinal edges, said tubing forming two loops and being interposed between the said wire spirals, one of said loops being free from contact with said wire spirals.

4. In a flexible pipe, the combination of spirally wound wire spirals, a spirally wound strip interposed between said spirals, the longitudinal edges of said strips extending higher than the wire spirals on the outside of the pipe and fastened together longitudinally to form a corrugated tube, said corrugated tube forming two loops, one of said loops being free and the other being in engagement with one wire spiral on the outside and one wire spiral on the inside.

5. In a flexible metallic pipe, the combination of one inner wire spiral and one outer wire spiral, a corrugated tube interposed between said two wire spirals, the outward formed corrugations of said tube being formed in a free loop, the two wire spirals combined adapted to maintain said outwardly faced free loop.

6. In a flexible pipe, the combination of a plurality of wire spirals and a corrugated tube interposed between said wire spirals, said corrugated tube being controlled and held in frictional contact with the wire spirals, whereby the internal pressure in the pipe will not directly act on the free corrugation of the tube.

7. In a flexible pipe, the combination of a plurality of wire spirals, a corrugated tube interposed between said spirals, said corrugated tube being controlled and held in frictional contact with the wire spirals whereby the wire spirals take up the internal pressure in the pipe and also maintain one loop of the corrugated tube free and yieldable.

8. In a flexible pipe, the combination of spirally wound wire spirals, a corrugated tube made from curved strips fastened together along their longitudinal edges and interposed between said wire spirals, said corrugated tube forming two loops, one being in contact with the wire spiral, the other being a free loop and facing outward of the pipe, the loop in frictional contact with the wire spirals being partly directly exposed to the internal pressure of the pipe, but relieved from the strain of the pressure by being substantially held in contact with the wire spirals.

In testimony whereof, I have signed my name to this specification in the presence of two subscribing witnesses.

AUGUST SUNDH.

Witnesses:
WALTER C. STRANG,
JAMES G. BETHELL.